(No Model.) 3 Sheets—Sheet 1.

M. SCOTT.
APPARATUS FOR MOLDING TILES.

No. 483,486. Patented Sept. 27, 1892.

WITNESSES. INVENTOR.

(No Model.) 3 Sheets—Sheet 2.

M. SCOTT.
APPARATUS FOR MOLDING TILES.

No. 483,486. Patented Sept. 27, 1892.

WITNESSES. INVENTOR.

Montezuma Scott
by W. Bakewell & Sons
his Attorneys (No Model.) 3 Sheets—Sheet 3.
M. SCOTT.
APPARATUS FOR MOLDING TILES.

No. 483,486. Patented Sept. 27, 1892.

WITNESSES. INVENTOR.

UNITED STATES PATENT OFFICE.

MONTEZUMA SCOTT, OF NEW BRIGHTON, PENNSYLVANIA, ASSIGNOR TO THE SCOTT TILE COMPANY, OF CHICAGO, ILLINOIS.

APPARATUS FOR MOLDING TILES.

SPECIFICATION forming part of Letters Patent No. 483,486, dated September 27, 1892.

Application filed December 4, 1891. Serial No. 414,045. (No model.)

*To all whom it may concern:*

Be it known that I, MONTEZUMA SCOTT, of New Brighton, in the county of Beaver and State of Pennsylvania, have invented a new and useful Improvement in Apparatus for Molding Tiles, of which the following is a full, clear, and exact description, reference being had to the accompanying drawings, forming part of this specification, in which—

Figure 1:
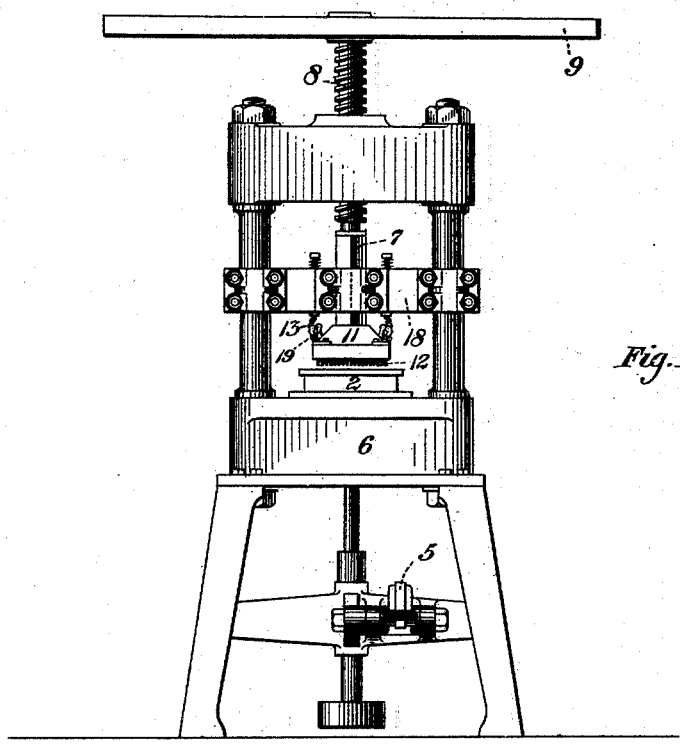
Figure 2:
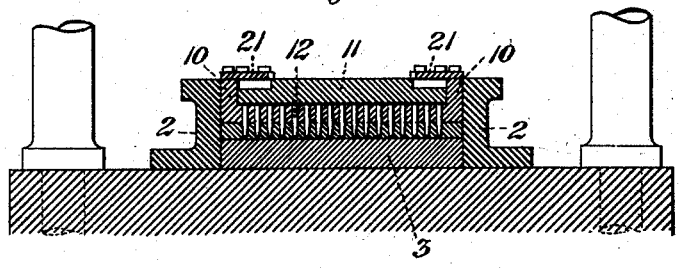
Figure 3:
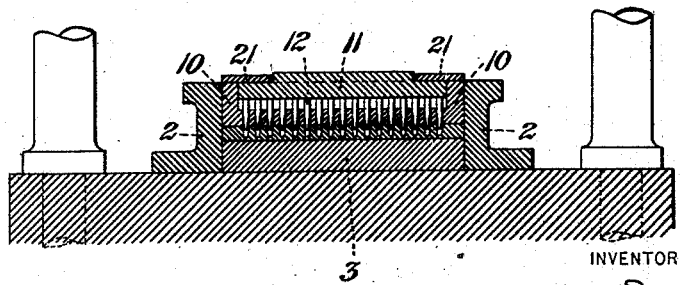
Figure 4:
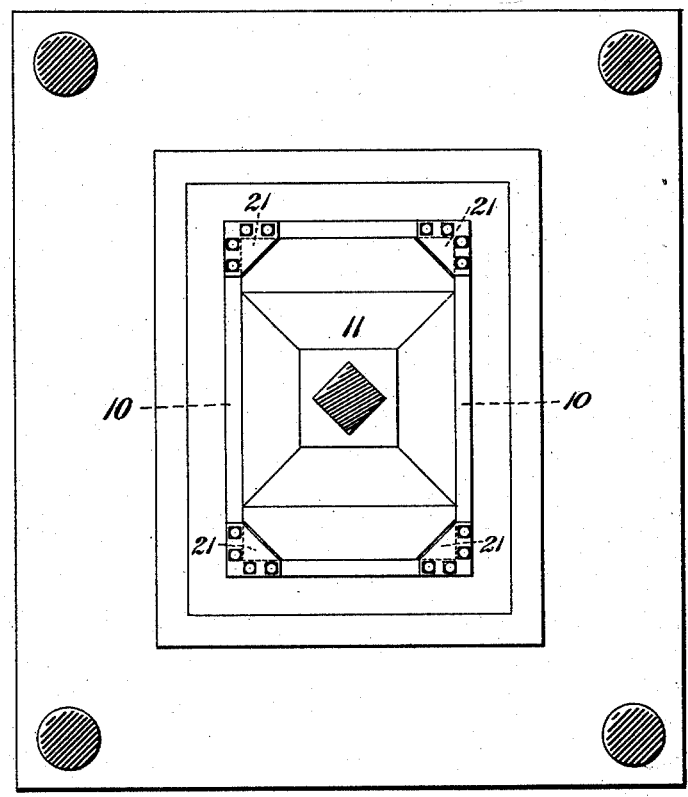
Figure 5:
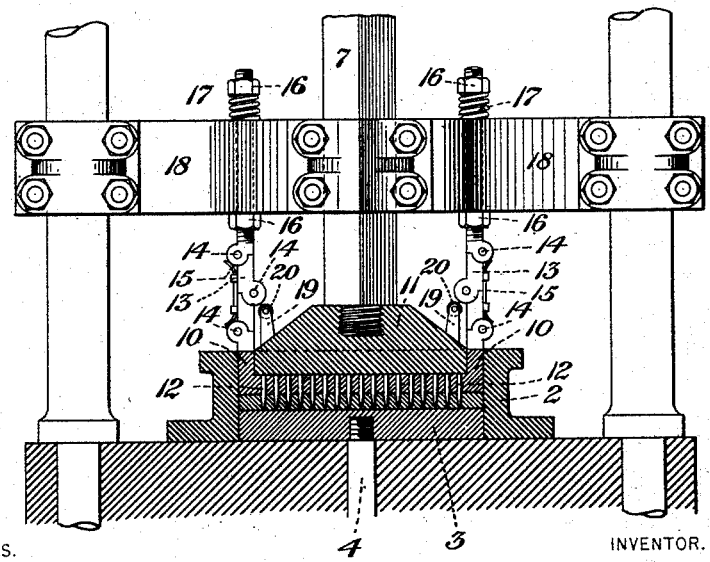
Figure 6:
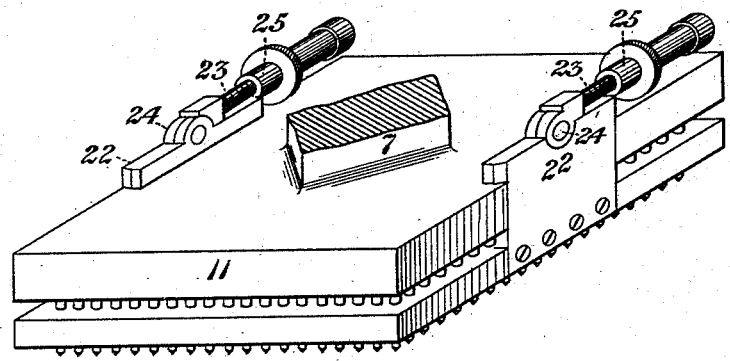
Figure 7:
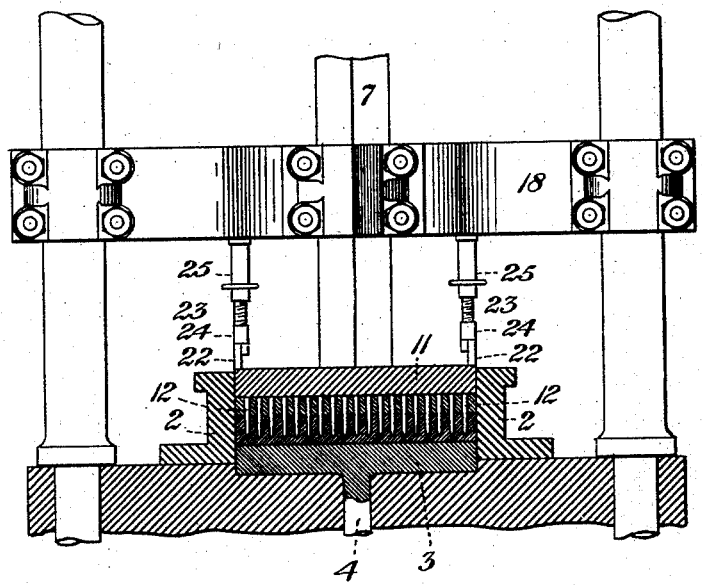

Figure 1 is a front elevation of my improved tile-machine. Figs. 2 and 3 are vertical cross-sectional views through the dies, showing the same in different positions. Fig. 4 is a horizontal cross-sectional view taken on the line IV IV of Fig. 1. Fig. 5 is an enlarged front elevation, the dies being shown in section. Fig. 6 is a perspective view of a modification; and Fig. 7 is an elevation, partly in section, of the same.

The object of my invention is to provide a machine for pressing tile with perforated backs rapidly without disfiguring or distorting the tile. I do not claim herein tile thus made as articles of manufacture, because I have made that the subject of a separate patent, No. 452,113, granted May 12, 1891.

The advantage of tile made with perforations in the back is that they are much more easily baked and because they allow the heat to have access uniformly to different portions of the tile during the baking process.

I have illustrated my invention with reference to a machine of the usual class used in the manufacture of tile, and consisting of a matrix or female die of the same shape and pattern in reverse as that of the tile to be produced and a vertically-moving male die or plunger, which moves down into the female die and forms the tile therein.

Referring now to the drawings, 2 represents the female die, which has a movable bottom 3, mounted at the upper end of a rod or plunger 4, and this plunger is provided with a foot-lever 5, by means of which the bottom may be raised to eject the tile when finished. The die 2 and the lever are suitably arranged on the frame 6 of the machine in a manner which is well understood by those skilled in the art and needs no detailed description.

7 is the vertically-moving plunger or stock of the upper die, which is worked by means of a screw 8 and suitable power-wheel 9. The face of this die consists of a plate 10 of suitable form, and above the plate 10 is a second plate 11, having a number of downwardly-projecting spurs 12, which extend through holes made for the purpose in the plate 10. The plate 11 is connected directly to the plunger 7, and the plate 10 is connected with the plate 11 by upright side pieces 13, which extend upwardly from the plate 10 and pass through the cross-bar 18, as shown. These side pieces are provided with three vertical hinge or knuckle joints 14, and upon their outer sides are secured the flat springs 15, held by bands upon each side of the middle joint. The pieces 13 are provided above and below the cross-bar with fastening-nuts 16, and between the face of the upper nut and the cross-bar is located the coiled spring 17. From the upper face of the plate 11 rise the two posts 19, provided with friction-wheels 20, arranged to engage the inwardly-projecting knuckle-joint 14 and break the same open against the action of the spring 15. As shown in Fig. 4, the corners of the recess of the plate 10, in which recess the plate 11 is seated, are covered with corner-plates 21, and the corners of the plate 11 are recessed downwardly for a considerable distance, so that the plate 11 may rise for a certain time before engaging the plate 21. The spring 17 takes up any undue downward movement of the plates, which would otherwise strain the cross-bar.

The action is as follows: Supposing the die-plates 10 and 11 to be raised, as in Fig. 1, sufficient clay is put into the female die 2, and by means of the power-wheel 9 the moving die is caused to descend. The descent of the plunger acting on the upper plate moves it downwardly, and disengaging the friction-wheels 20 from the knuckle-joints the springs push the joints straight as the plate 11 engages the plate 10 and the two plates move down together, the lower plate pressing the clay to the desired degree of compactness and the spurs of the upper plate being forced into the back of the clay tile to produce the desired perforations. When the tile has been pressed and it is desired to remove it from the die, the plunger is raised, and as the plate 11 moves with it the friction-wheels 20 strike the hinge-joints 14 and break the same open. The corners of the plate 11 then engage the corner-plates 21 and pull this plate upward, bending the joints outwardly, as shown in Fig. 1, upon which the tile may be ejected by the plunger 3. It is evident that until the knuckle-joints of the pieces 13 are opened these pieces hold the plate 10 and the tile down firmly, so that the pins 12, which are tapered for easy withdrawal, are partially drawn from the clay without any distorting of the article before the plate 10 is lifted.

In the modification of Figs. 6 and 7 the side pieces are formed with two projections 22, adapted to be engaged by the plate 11. 23 are short rods which are pivoted at 24 to the uprights 22, so that the bars may be moved on these pivots from horizontal to vertical positions. These bars are provided with sleeves 25, which are internally screw-threaded and engage with corresponding male threads on the bars 23, so that by turning these sleeves the operative lengths of the bars may be elongated or shortened. In this modification the action is not automatic, as in the former case; but after the plunger has moved down and the clay is pressed the rods are raised to a vertical position and elongated until they abut against the cross-piece. Upon the upward movement of the plunger the plate 11 rises until it reaches the shoulders or projections 22, when the rods are loosened and then turned into a horizontal position, and the plates then rise together, as in the former case.

It is obvious that my invention may be modified in very many different ways, not only as to the form of the parts to accommodate them to the different forms and shapes of the tile manufactured, but also in the arrangement of the parts, the only essential being that there shall be spurs which form the perforations in the tile and a plate which bears upon the tile and holds it, so as to permit the withdrawal or loosening of the parts without spoiling the tile.

The advantages of my invention will be apparent to those skilled in the art. It makes the manufacture of perforated-back tile simple and easily effected, and has the result of saving considerable cost to the manufacturer and of benefiting the user of the tile, because of the greater shapliness and uniformity of the tile which is produced.

I claim—

1. In apparatus for molding tiles, the combination of a matrix, a perforated plate or die having upwardly-extending hinged arms, and a plate or die having projecting spurs extending through the perforated die, whereby the perforated die is retained in position during a portion of the backward stroke of the die having spurs, substantially as and for the purposes described.

2. In tile-molding apparatus, the combination of a matrix having a movable bottom, a perforated plate or die having upwardly-projecting hinged arms, and a plate or die having projecting spurs extending through the perforated die and provided with means for operating the hinged arms, substantially as and for the purposes described.

3. In tile-molding apparatus, the combination of a matrix having a movable bottom, a perforated plate or die having upwardly-projecting jointed arms, a plate or die provided with projecting spurs extending through the perforated die and having arms arranged to press against and unlock the jointed arms upon upward movement of the plate, substantially as and for the purposes described.

In testimony whereof I have hereunto set my hand this 25th day of November, 1891.

MONTEZUMA SCOTT.

Witnesses:
 CLARENCE BYRNES,
 W. B. CORWIN.